United States Patent
Boynes (10) Patent No.: US 10,671,384 B1
(45) Date of Patent: Jun. 2, 2020

(54) PROACTIVE SEEDING OF BUILD ARTIFACTS

(71) Applicant: Amazon Technologies, Inc., Seattle, WA (US)

(72) Inventor: Jeremy Boynes, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 223 days.

(21) Appl. No.: 15/835,336

(22) Filed: Dec. 7, 2017

(51) Int. Cl.
- *G06F 8/71* (2018.01)
- *G06F 8/60* (2018.01)
- *H04L 29/08* (2006.01)
- *G06F 8/73* (2018.01)

(52) U.S. Cl.
CPC .............. *G06F 8/71* (2013.01); *G06F 8/60* (2013.01); *G06F 8/73* (2013.01); *H04L 67/1097* (2013.01)

(58) Field of Classification Search
CPC ..................................... G06F 8/71; G06F 8/60
See application file for complete search history.

(56) References Cited

U.S. PATENT DOCUMENTS

| | | | | |
|---|---|---|---|---|
| 6,951,010 B2* | 9/2005 | Sasaki | ............... | G06F 8/73 707/999.102 |
| 8,037,453 B1* | 10/2011 | Zawadzki | ............ | G06F 11/368 717/107 |
| 8,285,662 B2* | 10/2012 | Bitonti | ............ | G06F 8/71 706/47 |
| 8,352,919 B2 | 1/2013 | Misch et al. | | |
| 8,713,527 B2* | 4/2014 | Frontiero | ............ | G06F 8/71 717/120 |
| 8,762,944 B2 | 6/2014 | Frontiero et al. | | |
| 9,557,972 B2 | 1/2017 | Hur et al. | | |
| 10,089,108 B1* | 10/2018 | Noble | ............ | G06F 8/65 |
| 2005/0262482 A1* | 11/2005 | Wagner | ............ | G06F 8/71 717/120 |
| 2006/0271926 A1* | 11/2006 | Hutton | ............ | G06F 8/61 717/168 |
| 2008/0201705 A1* | 8/2008 | Wookey | ............ | G06F 8/658 717/175 |
| 2009/0031210 A1* | 1/2009 | Backhouse | ............ | G06F 16/958 715/234 |

(Continued)

OTHER PUBLICATIONS

Jeremy Wagner, "A Comprehensive Guide to HTTP/2 Server Push", Smashing Magazine, Apr. 2017, Source: https://www.smashingmagazine.com/2017/04/guide-http2-server-push/, pp. 1-30.

(Continued)

*Primary Examiner* — Philip Wang
(74) *Attorney, Agent, or Firm* — Robert C. Kowert; Kowert, Hood, Munyon, Rankin & Goetzel, P.C.

(57) ABSTRACT

Methods, systems, and computer-readable media for proactive seeding of build artifacts are disclosed. A dependency graph is determined that represents dependency relationships among a plurality of build artifacts. Using the dependency graph, a repository manager determines a first set of one or more build artifacts. The first set of build artifacts are stored in one or more repositories. The first set of build artifacts are sent from a repository manager to a client over a network. The first set of build artifacts are used by the client in generating a software build.

20 Claims, 8 Drawing Sheets

(56) References Cited

U.S. PATENT DOCUMENTS

| | | | | |
|---|---|---|---|---|
| 2010/0042974 A1* | 2/2010 | Gutz | ............... | G06F 8/71 |
| | | | | 717/121 |
| 2011/0239195 A1* | 9/2011 | Lin | ............... | G06F 8/71 |
| | | | | 717/126 |
| 2014/0298321 A1* | 10/2014 | Morino | ............... | G06F 8/61 |
| | | | | 717/175 |
| 2015/0363195 A1* | 12/2015 | Schlueter | ............... | G06F 8/71 |
| | | | | 717/121 |
| 2016/0034258 A1* | 2/2016 | Wijngaard | ............... | G06F 8/73 |
| | | | | 717/123 |
| 2016/0253625 A1* | 9/2016 | Casey | ............... | G06Q 10/103 |
| | | | | 717/101 |
| 2018/0081652 A1* | 3/2018 | Ahmed | ............... | G06F 8/4442 |
| 2018/0234329 A1* | 8/2018 | Wurth | ............... | H04L 43/50 |

OTHER PUBLICATIONS

"What is Maven?", Apache.org, Nov. 2017, Source: https://maven.apache.org/what-is-maven.html, pp. 1-2.

"Maven Central Repository", Apache.org, Nov. 2017, Source: https://maven.apache.org/repository/index.html, p. 1.

* cited by examiner

PROACTIVE SEEDING OF BUILD ARTIFACTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. When customers access such facilities remotely, the facilities may be said to reside "in the cloud" and may represent cloud computing resources.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for proactive seeding of build artifacts are described. Using the techniques described herein, a software build process may be expedited by proactively downloading build artifacts from a repository. Build artifacts may include libraries, functions, plugins, modules, packages, and other elements of source code and data associated with generating software builds. A first build artifact may be dependent on one or more other build artifacts, such that use of the first build artifact requires the other build artifacts. A repository manager may build a dependency graph that represents build artifacts as nodes and dependency relationships as edges, e.g., for a particular software build. The repository manager may use any suitable metadata to build the graph, including formal dependency relationships as well as informal relationships between build artifacts determined by monitoring network use in a build environment. Instead of waiting for a client to request build artifacts that are currently needed for the software build, the repository manager may proactively send build artifacts to the client. Using the dependency graph, the repository manager may determine which artifacts to send and in what order. The client can perform other build tasks (e.g., compilation or testing of other components) while build artifacts are proactively downloading. By the time the client needs a particular build artifact for the software build, the particular build artifact may be waiting in a cache memory of the client after having been proactively seeded by the repository manager. In one embodiment, the repository manager may use an HTTP/2 server push to proactively seed build artifacts into a cache at the client. In one embodiment, the client may use a network proxy to obtain the build artifacts. Due to the proactive seeding of build artifacts, the build process need not be delayed by repeated round trips between the client and the repository to obtain build artifacts as they are needed. Proactive seeding of build artifacts may instead provide an element associated with source code to a build tool before the build tool reaches a point at which it requires that element, thus expediting the build process.

Figure 1:
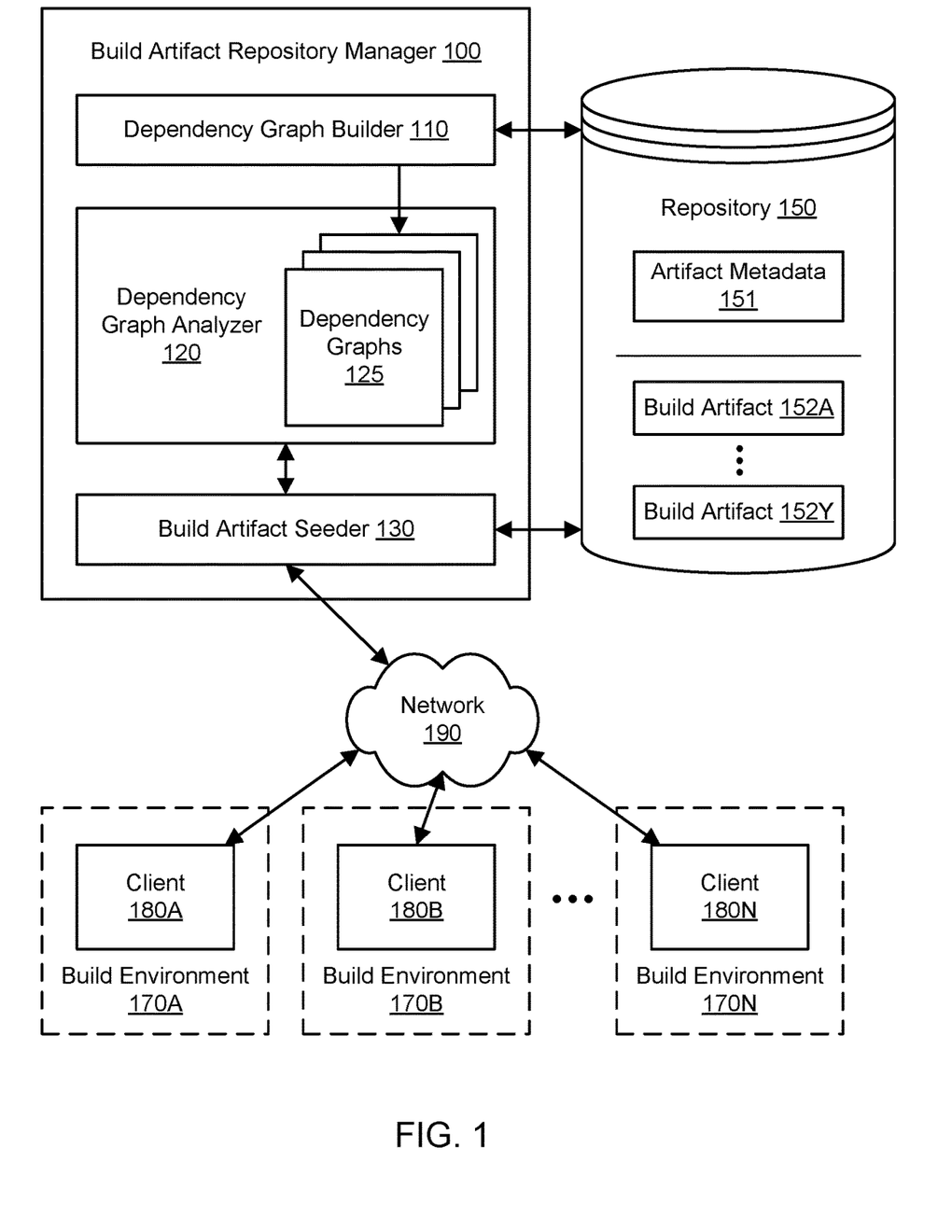
FIG. 1 illustrates an example system environment for proactive seeding of build artifacts, according to some embodiments.

FIG. 1 illustrates an example system environment for proactive seeding of build artifacts, according to some embodiments. A build artifact repository manager 100 may manage access to build artifacts 152A-152Y in a repository 150. The repository 150 may be implemented using any suitable storage subsystems, potentially including storage services of a provider network. Build artifacts may include libraries, functions, plugins, modules, packages, container images, and other elements of source code and data associated with generating software builds. The repository 150 may store the actual build artifacts 152A-152Y (e.g., may store the program code or data for the artifacts) as well as metadata 151 describing aspects of the build artifacts. In one embodiment, the metadata 151 may indicate dependency relationships between individual artifacts, where a dependency indicates that that use of one build artifact requires one or more other build artifacts. In one embodiment, the metadata 151 may also represent names, publishers, version numbers, summaries of functionality, installation requirements, and so on, for various ones of the artifacts 152A-152Y. Although build artifacts 152A-152Y are shown for purposes of illustration and example, it is contemplated that any suitable number and configuration of build artifacts may be stored by the repository 150 and used for proactive seeding. The build artifacts 152A-152Y may represent a variety of programming languages and/or build environments, such as build environments 170A-170N. A subset of the build artifacts 152A-152Y may be used to generate a software build, e.g., by compiling the high-level source code of the artifacts using conventional compilation techniques. A software build may represent a specific version of a piece of software, such as a specific patch for a specific operating system from a specific publisher or a specific release of application software. A software build may include executable program code that can be run on a computer system, e.g., the example computing device 3000 shown in FIG. 7.

The repository manager 100 may interact with a plurality of clients 180A-180N via a network 190, such that the repository manager may perform tasks on behalf of the clients using a client-server approach. The repository manager 100 may be located in a remote location with respect to the clients 180A-180N, such as in a data center that does not contain the clients. The functionality of the repository manager 100 may be offered to the clients 180A-180N using any suitable interface(s), such as one or more application programming interfaces (APIs) or other programmatic interfaces. For example, a client 180A may send a request to begin a software build to the build artifact seeder 130, and the repository manager 100 may initiate tasks such as the building of a dependency graph, the analysis of the dependency graph, and the proactive seeding of build artifacts in response to that request.

The clients 180A and 180B through 180N may be part of respective build environments 170A and 170B through 170N. The build environments 170A-170N may represent one or more types of build environments. The repository manager 100 may provide proactive seeding of build artifacts for a variety of different build environments. A particular build environment may be associated with one or more build tools that perform various tasks (such as compilation and testing), one or more high-level programming languages that the build tool(s) can compile into executable program code, and so on. Examples of build environments may include Apache Maven for building Java programs, NPM for building Javascript scripts, and so on. In some embodiments, some of the build environments 170A-170N may be associated with their own repositories of build artifacts. For example, the Apache Maven build environment may use build artifacts from the Central Repository for the Apache Maven environment. As shown in FIG. 1, the repository 150 may represent one or more repositories that are associated with one or more particular build environments, such as Maven Central for the Apache Maven environment, and to which the repository manager 100 has access. The repository 150 may provide version management for artifacts. In some embodiments, the repository 150 may be located remotely with respect to the repository manager 100 and may be accessed by the repository manager via one or more APIs over a network. The repository 150 may include build artifacts provided by many users, e.g., open-source software artifacts or artifacts subject to particular license terms.

The repository manager 100 may include components such as a dependency graph builder 110, a dependency graph analyzer 120, and a build artifact seeder 130. Using the dependency graph builder 110, the repository manager 100 may build dependency graphs 125 that represents build artifacts as nodes and dependency relationships as edges, e.g., for particular software builds. The repository manager 100 may use any suitable metadata 151 to build the graph. In one embodiment, the metadata 151 may include formal dependency relationships between build artifacts, e.g., as determined using static analysis of the artifacts themselves. In one embodiment, the metadata 151 may include informal dependency relationships between build artifacts, e.g., as determined using dynamic analysis of artifact execution by monitoring network use in a build environment. Instead of waiting for a client to request build artifacts that are currently needed for a software build, the repository manager 100 may proactively send build artifacts to the client. Using the dependency graph analyzer 120, the repository manager 100 may analyze the dependency graphs 125 to determine which artifacts to send to a client and an order in which to send the artifacts. Using the build artifact seeder 130, the repository manager 100 may proactively send the artifacts to clients for use by the clients in generating software builds. In one embodiment, a client can perform other build tasks (e.g., compilation or testing of other components) while build artifacts are proactively downloading. By the time the client needs a particular build artifact for a software build, the particular build artifact may be waiting in a cache memory of the client after having been proactively seeded by the repository manager 100.

A technical problem with prior approaches is that software build tools may request downloading of build artifacts only as they are needed during a build process. For example, the Apache Maven tool for Java may rely on a central repository, and Node.js may rely on the npmjs.com central repository for packages. Due to the client-driven nature of prior approaches involving such repositories, a build process may be delayed by repeated round trips between the client and the repository to obtain build artifacts as the need arises during the build. Using the techniques described herein to address this technical problem, a software build process may be expedited by proactively seeding build artifacts that are likely to be needed in the near future instead of waiting until the client specifically requests the build artifacts. The build tool may concurrently perform other tasks while build artifacts are proactively seeded. Proactive seeding of build artifacts may reduce delays in the build process and thus permit developers to make more efficient use of both developers' time and computing resources.

Figure 7:
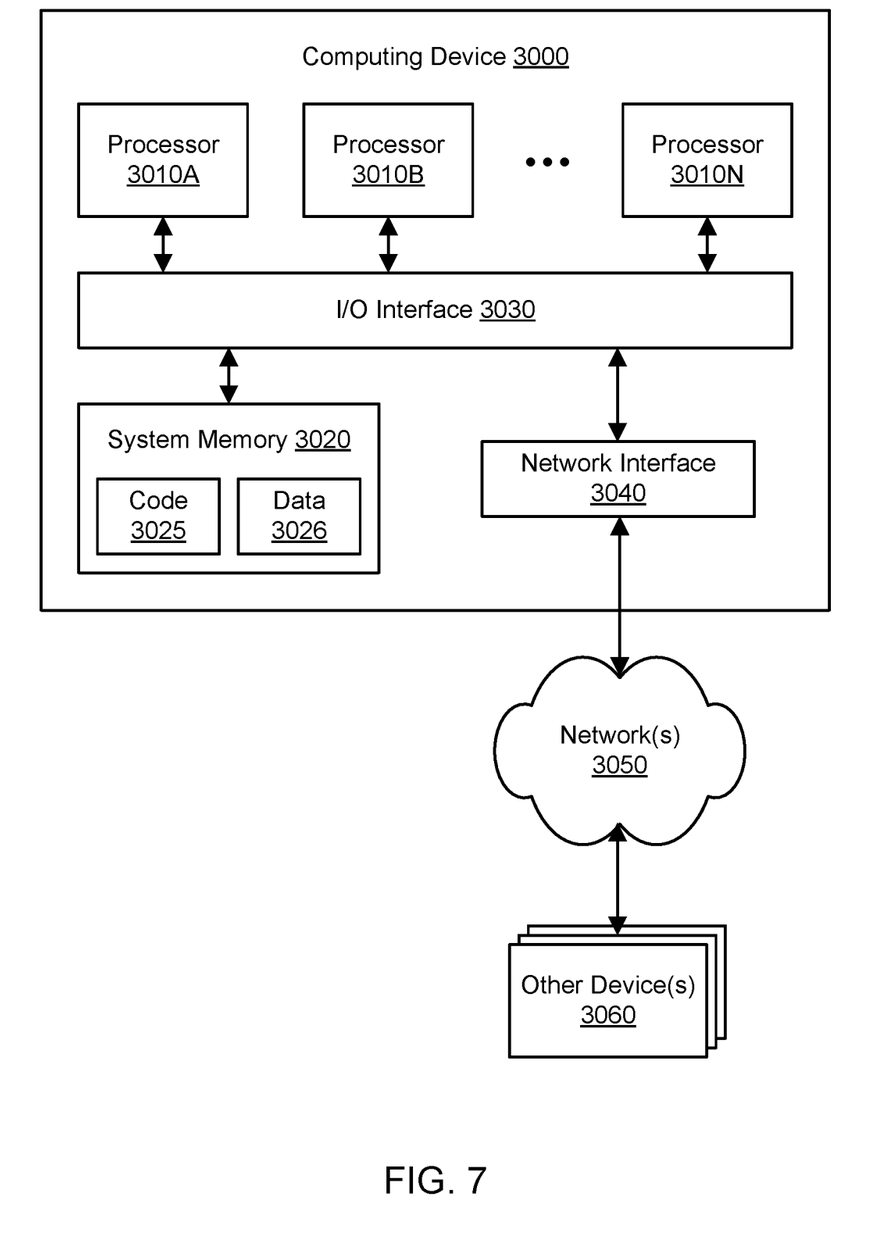
FIG. 7 illustrates an example of a computing device that may be used in some embodiments.

Clients 180A-180N may represent computing devices such as the example computing device 3000 illustrated in FIG. 7. Clients 180A-180N may convey network-based service requests to the service 100 via one or more networks such as network 190. In various embodiments, network 190 may encompass any suitable combination of networking hardware and protocols necessary to establish network-based communications between clients 180A-180N and the service 100. For example, the network 190 may generally encompass the various telecommunications networks and service providers that collectively implement the Internet. The network 190 may also include private networks such as local area networks (LANs) or wide area networks (WANs) as well as public or private wireless networks. For example, both a given client and the service 100 may be respectively provisioned within enterprises having their own internal networks. In such an embodiment, the network 190 may include the hardware (e.g., modems, routers, switches, load balancers, proxy servers, etc.) and software (e.g., protocol stacks, accounting software, firewall/security software, etc.)

necessary to establish a networking link between the given client and the Internet as well as between the Internet and the service 100. It is noted that in some embodiments, any of clients 180A-180N may communicate with service 100 using a private network rather than the public Internet.

The repository manager 100 may be implemented using one or more computing devices, any of which may be implemented by the example computing device 3000 illustrated in FIG. 7. In various embodiments, portions of the functionality of the repository manager 100 may be provided by the same computing device or by any suitable number of different computing devices. If any of the components of the repository manager 100 are implemented using different computing devices, then the components and their respective computing devices may be communicatively coupled, e.g., via a network. Each of the illustrated components may represent any combination of software and hardware usable to perform their respective functions. It is contemplated that the repository manager 100 may include additional components not shown, fewer components than shown, or different combinations, configurations, or quantities of the components shown.

Figure 2A:
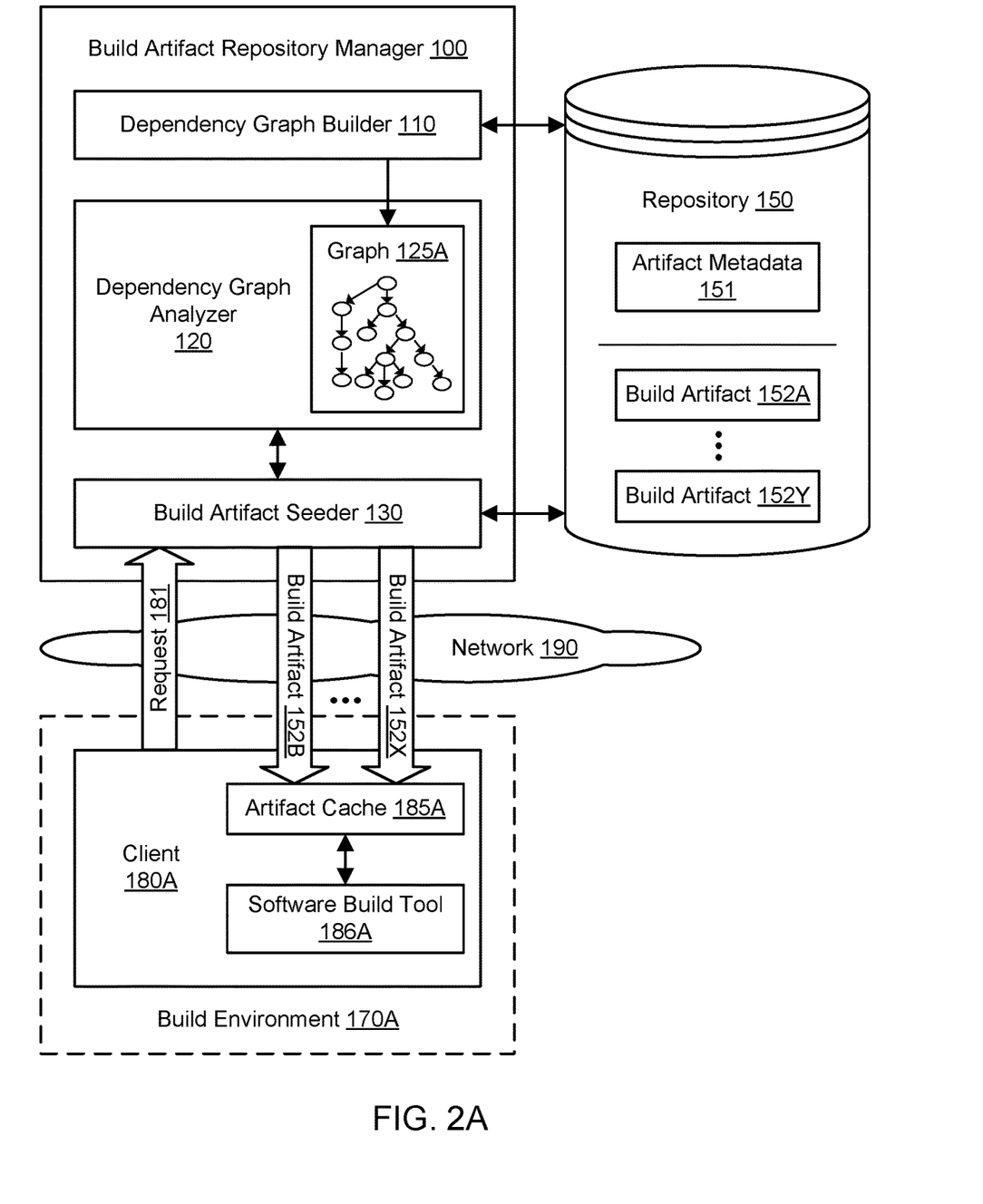
FIG. 2A illustrates further aspects of the example system environment for proactive seeding of build artifacts, including caching of build artifacts at a client, according to some embodiments.

FIG. 2A illustrates further aspects of the example system environment for proactive seeding of build artifacts, including caching of build artifacts at a client, according to some embodiments. In one embodiment, a client 180A may initiate the proactive seeding process using a request 181. The request 181 may represent a call to an API or other programmatic interface associated with the build artifact seeder 130 or other component of the repository manager 100. In one embodiment, the request 181 may not specifically identify any of the build artifacts 152A-152Y. In one embodiment, the request 181 may not specifically identify all of the build artifacts that are proactively seeded to the client 180A; for example, the request may identify one build artifact, and the repository manager 100 may identify and proactively seed other build artifacts that have dependency relationships with the artifact identified in the request (e.g., in a subtree for the identified artifact). In one embodiment, the request 181 may include an indication of the particular software build that the client 180A is seeking to generate. In one embodiment, the request 181 may include a portion of the dependency graph 125A for a particular software build, e.g., as determined by static analysis of the source code by a software build tool 186A.

Based on the indication of the software build and/or other metadata in the request 181, the dependency graph builder 110 may retrieve, generate, or otherwise determine a graph 125A of dependencies among various build artifacts associated with that software build. The graph 125A may represent a directed graph or tree. The dependency graph 125A may include nodes that represent build artifacts and edges that represent dependency relationships. The graph 125A may be built using artifact metadata 151 maintained by the repository 150. In one embodiment, the metadata 151 may include formal dependency relationships between build artifacts, e.g., as determined using static analysis of the artifacts themselves. In one embodiment, the metadata 151 may include informal dependency relationships between build artifacts, e.g., as determined using dynamic analysis of artifact execution by monitoring network use in the build environment 170A. In one embodiment, at least some of the metadata 151 may be determined based on prior interactions with the client 180A or with one or more users, e.g., for building prior versions of the current software build. In one embodiment, at least some of the metadata 151 may be determined based on static analysis of the source code of a software build.

Instead of waiting for the client 180A to request build artifacts that are currently needed for a software build, the repository manager 100 may proactively send build artifacts to the client. Using the dependency graph analyzer 120, the repository manager 100 may analyze the dependency graph 125A to determine which artifacts to send to the client 180A and an order in which to send the artifacts. For example, the repository manager 100 may determine that a first set of one or more build artifacts 152B should be sent at a first time, then another set of one or more build artifacts 152X should be sent at a second time, and so on, until all the build artifacts of the graph 125A have been provided to the client 180A. The order may be based on a breadth-first traversal of the graph 125A, a depth-first traversal of the graph, or a combination thereof. In determining the order in which to seed the build artifacts, the repository manager 100 may seek to satisfy dependency relationships among artifacts and to reduce latency at the client 180A. For example, a compiler plugin may be needed early in the build process by a software build tool 186A, potentially even before the source code of a project is retrieved. The repository manager 100 may know (based on the metadata 151) that the standard version of the compiler plugin has a tree with twenty dependencies, and so the repository manager may seed those twenty build artifacts on which the compiler depends, either before seeding the compiler or in the same batch of artifacts. The build artifact seeder 130 may use multiple network connections or one network connection to send multiple artifacts concurrently. In one embodiment, the repository manager 100 may implement semantic versioning. For example, if a project requires version 2.x of a plugin, but the repository includes version 2.2 and version 2.4, then the repository manager may which version to proactively seed.

Using the build artifact seeder 130, the repository manager 100 may proactively send the artifacts to clients for use by the clients in generating software builds. The proactive seeding of build artifacts by the repository manager 100 may represent a speculative push of build artifacts that the manager anticipates or predicts will be needed in the near future by the client 180A. In some embodiments, the predictive aspect may be influenced by analysis of latency for prior builds. In one embodiment, a client can perform other build tasks, such as compilation or testing of other modules, while build artifacts are proactively downloading. For example, if build artifact 152B is seeded first, and all of its dependencies are met, the software build tool 186A may compile a module that uses that build artifact 152B while another build artifact 152X is being proactively seeded to the client 180A. Then, by the time the client 180A needs the build artifact 152X for the software build, the build artifact 152X may be waiting in the artifact cache 185A after having been proactively seeded by the repository manager 100. In one embodiment, proactively seeding build artifacts may include seeding related items, such as hash files and signature files related to a build artifact, that may not necessarily be represented in the dependency graph 125A. Generating software builds may include tasks such as compilation, packaging, testing, and deployment. For example, the build artifact seeder 130 may provide proactive seeding of build artifacts that are then used in a deployment process (e.g., of a software build to a production environment).

The build environment 170A may represent a continuous integration environment in which a software build is updated on a periodic basis. In the continuous integration environment, the software build may be updated according to a schedule or as individual components are updated, potentially as often as several times a day. The individual components may be provided by multiple developers. The continuous integration environment may represent an automated approach to keeping a software build up-to-date. In one embodiment, when a software build is first generated in a continuous integration environment, a full set of build artifacts 152B-152X may be proactively seeded by the repository manager 100. In one embodiment, when the software build is updated in a continuous integration environment, only a subset of the build artifacts 152B-152X may be proactively seeded by the repository manager 100, while the remainder of the build artifacts 152B-152X may remain in the cache 185A. In one embodiment, the repository manager 100 may maintain a view into the artifact cache 185A and may proactively seed artifacts that are not already in the cache. In one embodiment, every build in the continuous integration environment may start with a clean slate, and the repository manager 100 may generate the graph 125A and send the build artifacts 152B-152X for a particular build according to the repository manager's knowledge of prior builds. In a continuous integration environment, the repository manager 100 may maintain metadata for a software build that carries over from one iteration of the build process to the next and may learn from earlier iterations.

In one embodiment, the repository manager 100 may use an HTTP/2 server push to proactively seed build artifacts into a cache 185A at the client 180A. The HTTP/2 server push may represent a functionality of the HTTP/2 protocol that permits servers to send items (e.g., style sheets, scripts, and images) to clients before the clients request the items. Using HTTP/2, the build artifact seeder 130 or other component of the repository manager 100 may have a view of the client-side cache 185A. Using this view, the repository manager 100 may have knowledge of which build artifacts are ready for use by the client 180A and which build artifacts are not currently present and should be proactively seeded. In one embodiment, the client 180A may have a native HTTP/2 compatibility, and the cache 185A may represent an HTTP/2-compliant cache. The software build tool 186A may issue requests for build artifacts using HTTP/2, and the requests may be directed to the cache 185A instead of to the repository 150 or repository manager 100. The cache 185A may respond by providing the proactively seeded artifacts to the build tool 186A. In one embodiment, the use of the cache 185A by an HTTP/2-capable client may be transparent to the build tool 186A.

As an example of proactive seeding, a developer may seek to build source code for a project in an Apache Maven build environment. Using the client device 180A, the developer may go to a source code repository such as GitHub and check out the source code for the project. Building the source code may require various plugins such as a compiler plugin and a packaging plugin. Using prior approaches, the build tool might load the compiler plugin first, determine that it needs other components based on metadata for the compiler plugin, then load the other components, and so on with the source code itself, with numerous delays throughout the process while artifacts are being downloaded. To perform proactive seeding, when a build is initiated for the first time, the build tool 186A may contact the repository manager 100 (e.g., over an HTTP/2 connection) to obtain the first resource, the compiler plugin. The repository manager 100 may determine the dependency graph for the compiler plugin, determine several modules that the compiler plugin needs, and begin seeding the cache 185A with those modules. When the build tool 186A tries to resolve the dependencies, the tool can simply read them from the local cache 185A rather than having to wait to fetch them over a network. As a further example of proactive seeding, the client 180A may inform the repository manager 100 when a user has checked out source code for a particular project from a source such as GitHub. The repository manager 100 may use this knowledge to obtain and analyze metadata 151 for the project and then seed the artifact cache 185A with relevant build artifacts 152B-152X before the build tool 186A specifically requests those build artifacts. In some embodiments, triggers for proactive seeding may include the name of a project, the identity or profile of a user, analysis of prior builds by other users, and so on.

Figure 2B:
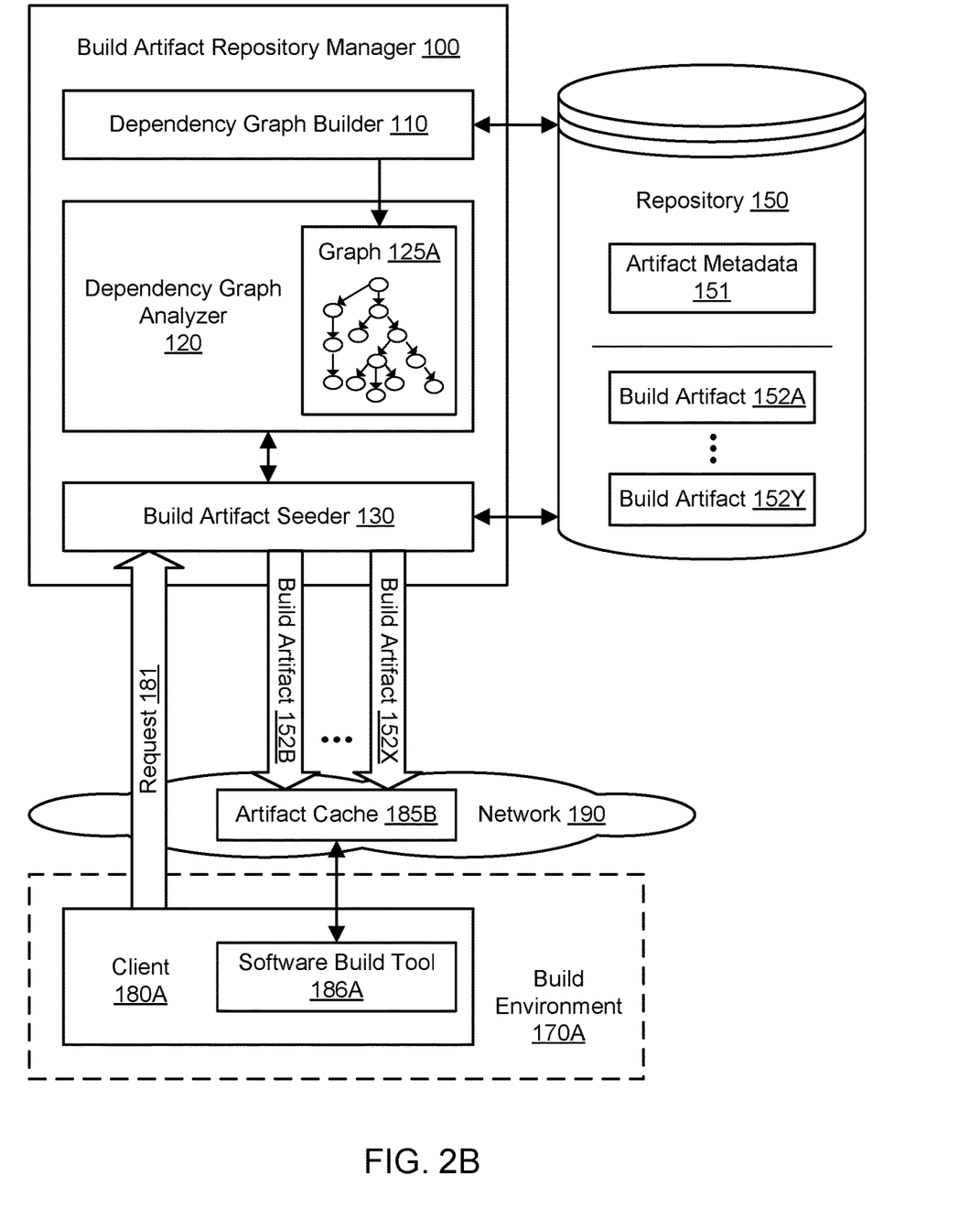
FIG. 2B illustrates further aspects of the example system environment for proactive seeding of build artifacts, including caching of build artifacts in the network infrastructure, according to some embodiments.

FIG. 2B illustrates further aspects of the example system environment for proactive seeding of build artifacts, including caching of build artifacts in the network infrastructure, according to some embodiments. In one embodiment, the artifact cache 185B may be implemented between the client 180A and the repository manager 100. In one embodiment, the cache 185B may be located in the network infrastructure of the network 190. In one embodiment, the artifact cache 185B may be implemented in a networked component as part of a content delivery network (CDN). The use of a CDN may permit the cache 185B to be located relatively close to the client 180A (in terms of network latency) in order to improve performance of the software build tool 186A that relies on the cache. As discussed above with respect to FIG. 2A, the software build tool 186A may issue requests for build artifacts, and the requests may be directed to the cache 185B instead of to the repository 150 or repository manager 100. The cache 185B may respond by providing the proactively seeded artifacts to the build tool 186A.

Figure 3:
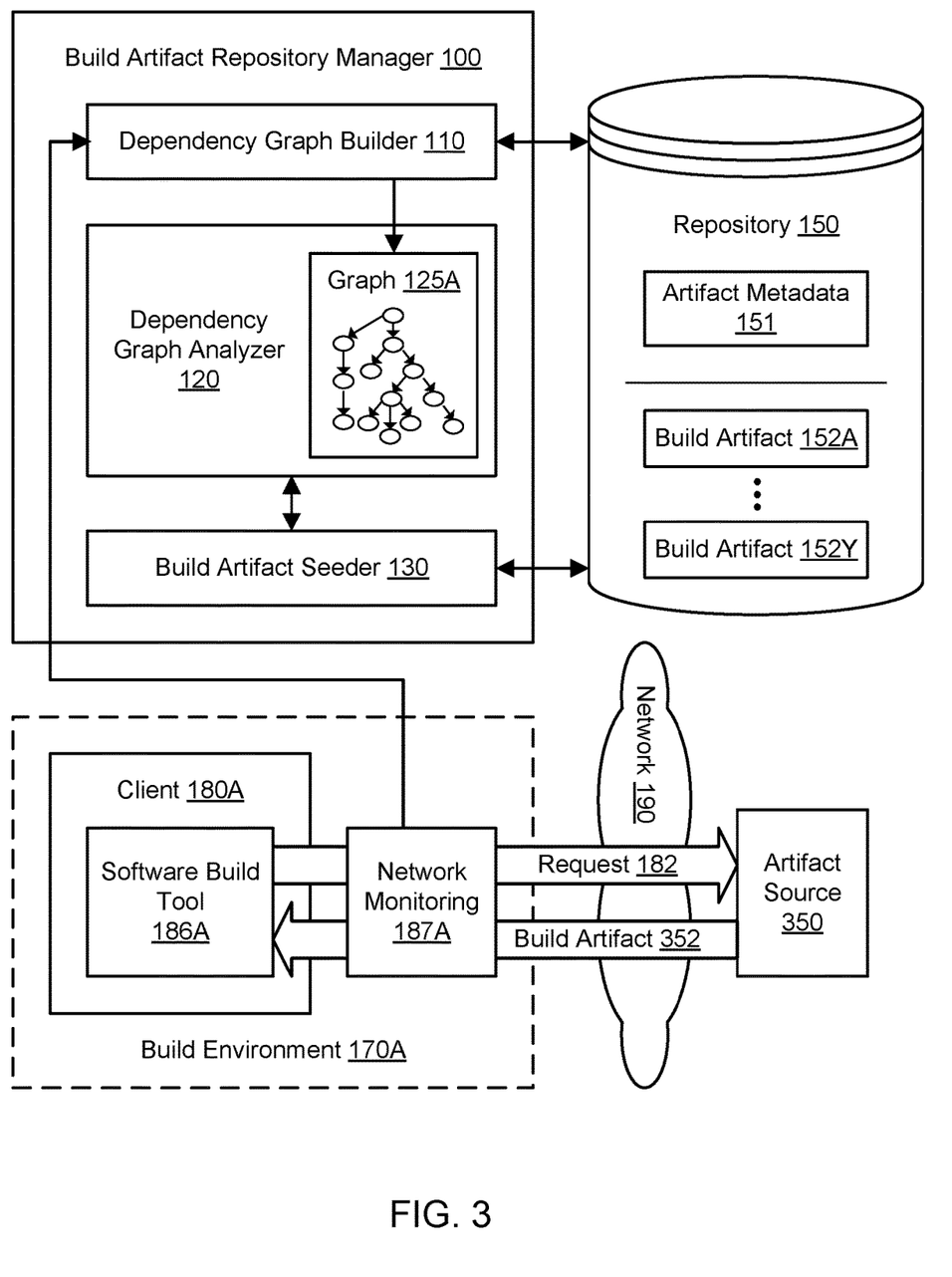
FIG. 3 illustrates further aspects of the example system environment for proactive seeding of build artifacts, including network monitoring in the build environment to identify informal nodes in the dependency graph, according to some embodiments.

FIG. 3 illustrates further aspects of the example system environment for proactive seeding of build artifacts, including network monitoring in the build environment to identify informal nodes in the dependency graph, according to some embodiments. As discussed above, the metadata 151 may include informal dependency relationships between build artifacts, e.g., as determined using dynamic analysis of artifact execution by monitoring network use in a build environment. In one embodiment, network monitoring 187A may be used in the build environment 170A in order to determine the fetching of particular build artifacts. The software build tool 186A may send a request 182 for a build artifact 352 to an external artifact source 350, e.g., over an HTTP connection via a network 190. For example, one build artifact seeded by the repository manager 100 may run a shell script that obtains another artifact 352 from the web-based source 350. The artifact 352 may represent program code or data. The network monitoring 187A may detect the request 182 and use it to update the artifact metadata 151 and/or dependency graph 125A for the software build, e.g., to reflect the dependency of a node on the retrieved artifact 352. In one embodiment, the repository manager 100 may then proactively seed the build artifact 252 for future builds in order to reduce the latency of the build process at the client 180A.

Figure 4:
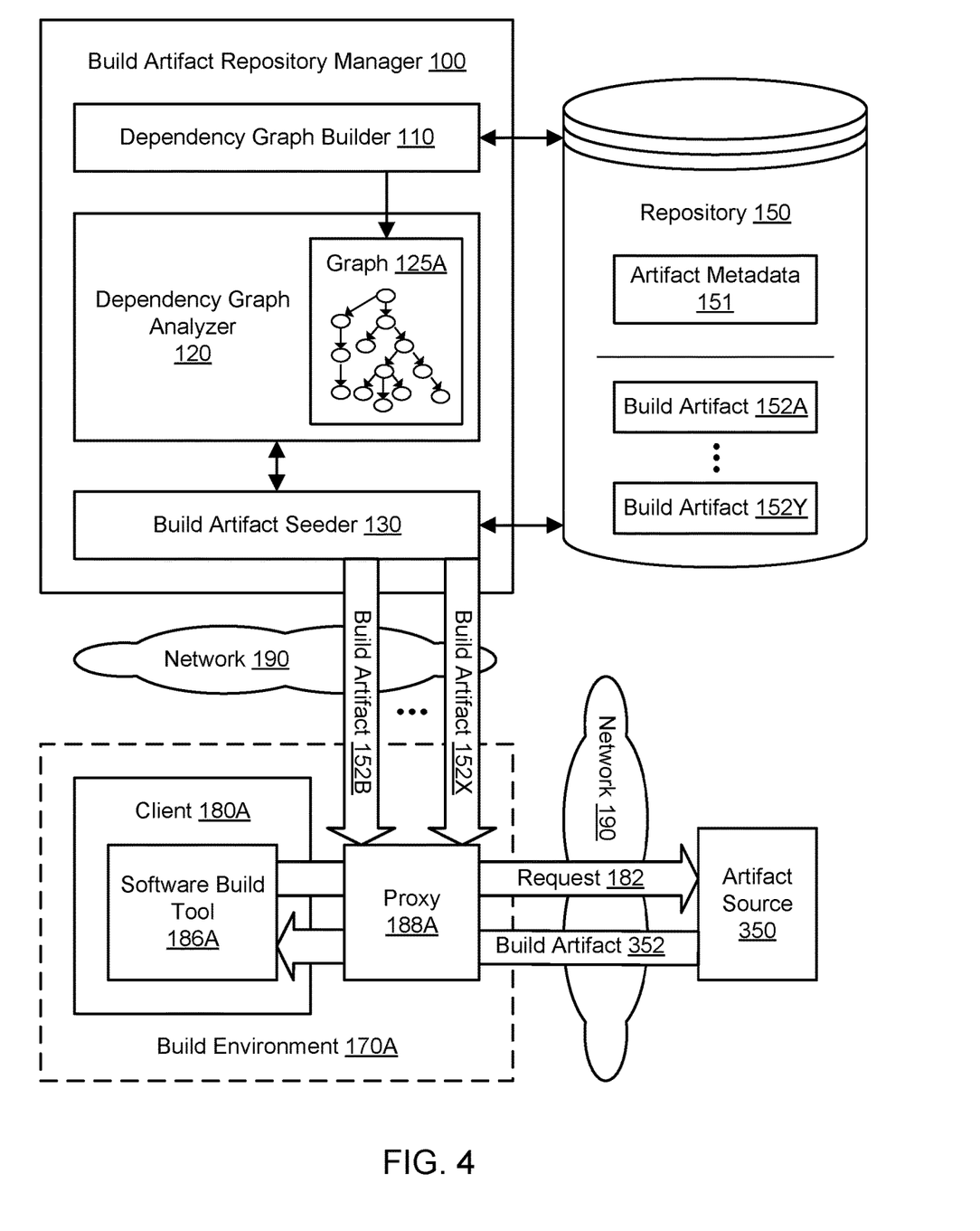
FIG. 4 illustrates further aspects of the example system environment for proactive seeding of build artifacts, including a client-side proxy that obtains build artifacts, according to some embodiments.

FIG. 4 illustrates further aspects of the example system environment for proactive seeding of build artifacts, including a client-side proxy that obtains build artifacts, according to some embodiments. In one embodiment, the client may use a network proxy 188A to obtain the build artifacts. In one embodiment, the build tool 186A may interact with a network proxy 188A to obtain and cache build artifacts. In one embodiment, the network proxy 188A may be HTTP/2-compliant. In one embodiment, the proxy 188A may represent a smart proxy that has awareness of the dependency graph 125A, e.g., as provided by the repository manager 100. The proxy server 188A may be used to retrieve build artifacts 152B-152X from the repository manager and from other sources. In one embodiment, proxy server 188A may be used to retrieve build artifact 352 from the external artifact source 350. Network monitoring 187A may be implemented using the proxy 188A.

As an example of proactive seeding, the software build tool 186A may initiate the build process for a Java application. Compilation of the Java application may result in creation of a Docker container image. If the Docker build script would install packages from a Debian repository, then the repository manager 100 may pre-seed all the Java build artifacts on which the application is dependent, pre-seed and stage any Docker base images on which the container image is built, and also pre-seed the contents of Debian packages that are used by the Docker build script. The proxy 188A may be used to obtain and cache all these resources in order to reduce the need for the build tool 186A to wait for items to be downloaded as the need for those items arises.

Figure 5:
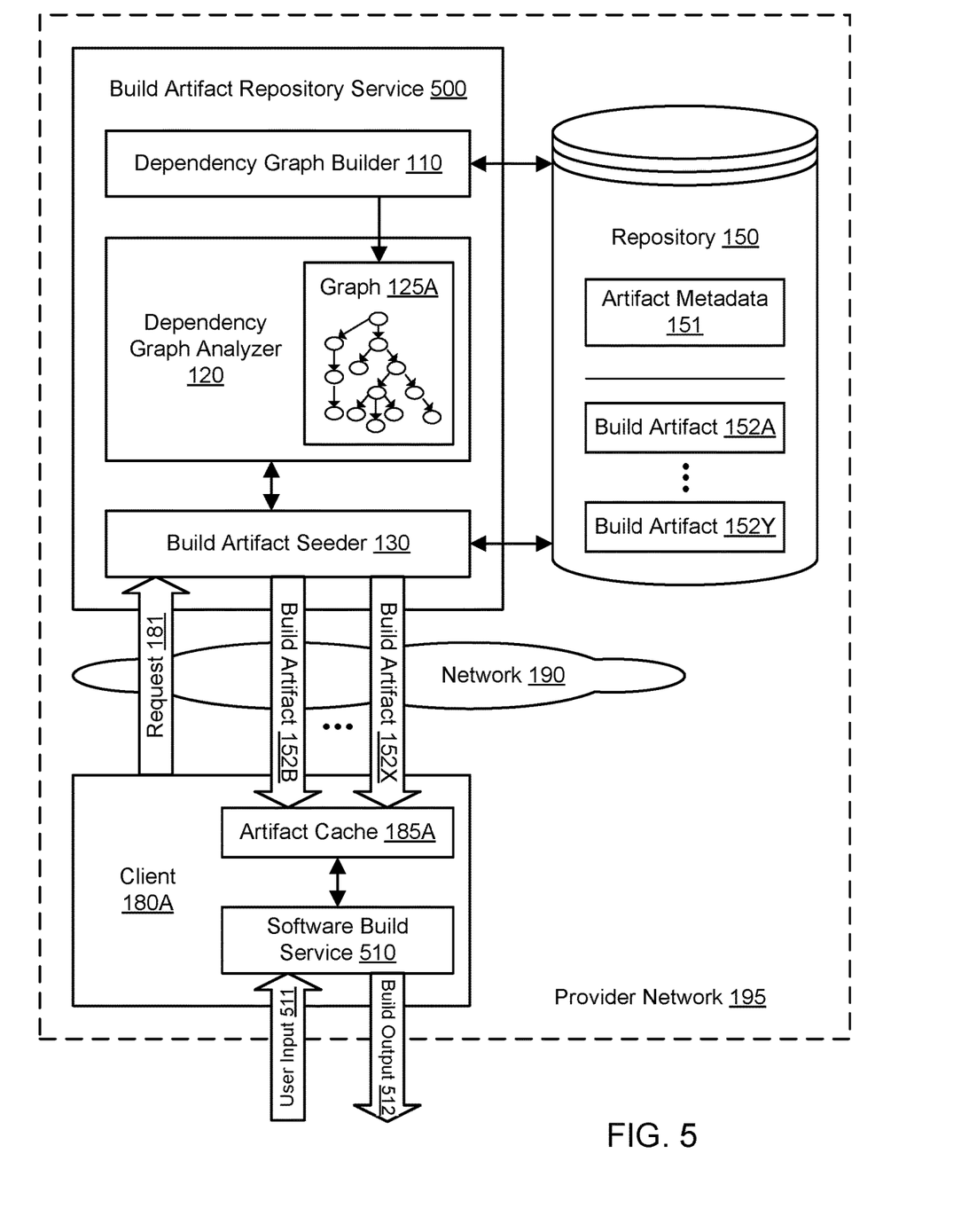
FIG. 5 illustrates further aspects of the example system environment for proactive seeding of build artifacts, including a provider network that provides repository management and software building as services, according to some embodiments.

FIG. 5 illustrates further aspects of the example system environment for proactive seeding of build artifacts, including a provider network that provides repository management and software building as services, according to some embodiments. The functionality of the repository manager 100 may be offered as a build artifact repository service 500. The functionality of the software build tool 186A may be offered as a software build service 510. The service 500 and/or service 510 may be implemented in a service-oriented system with a plurality of services that interact with one another according to a service-oriented architecture. The functionality of the service 500 and/or service 510 may be invoked using appropriate calls to a service interface exposed by the respective service, e.g., an application programming interface (API) or other programmatic interface. The functionality of the service 500 and/or service 510 may be invoked by another service or by a user. For example, the functionality of the repository service 500 may be invoked by the software build service 510, and the functionality of the software build service may be invoked by a user according to user input 511. The software build service 510 may produce build output 512 including a software build, and the build output may be provided to the user associated with the user input 511.

The service 500 and/or service 510 may be implemented in a provider network 195. The user associated with the user input 511 may be outside the provider network 195 but may provide input to control the software build service 510 and/or client computing device 180A. The provider network 195 may be operated by an entity such as a business or a public-sector organization to provide resources (such as computing resource 180A) and/or services (such as services 500 and 510 as well as various types of cloud-based computing or storage services) to a distributed set of clients via the Internet and/or other networks. The provider network 195 may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 195 in different embodiments, including computer servers, storage devices, network devices, and the like.

In one embodiment, the provider network 195 may implement a flexible set of resource reservation, control, and access interfaces for clients. For example, the provider network 195 may implement a programmatic resource reservation interface (e.g., via a web site or a set of web pages) that allows clients to learn about, select, purchase access to, and/or reserve resources. In one embodiment, resources may be reserved on behalf of clients using a client-accessible service. In one embodiment, the provider network 195 may execute tasks on behalf of clients using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

Figure 6:
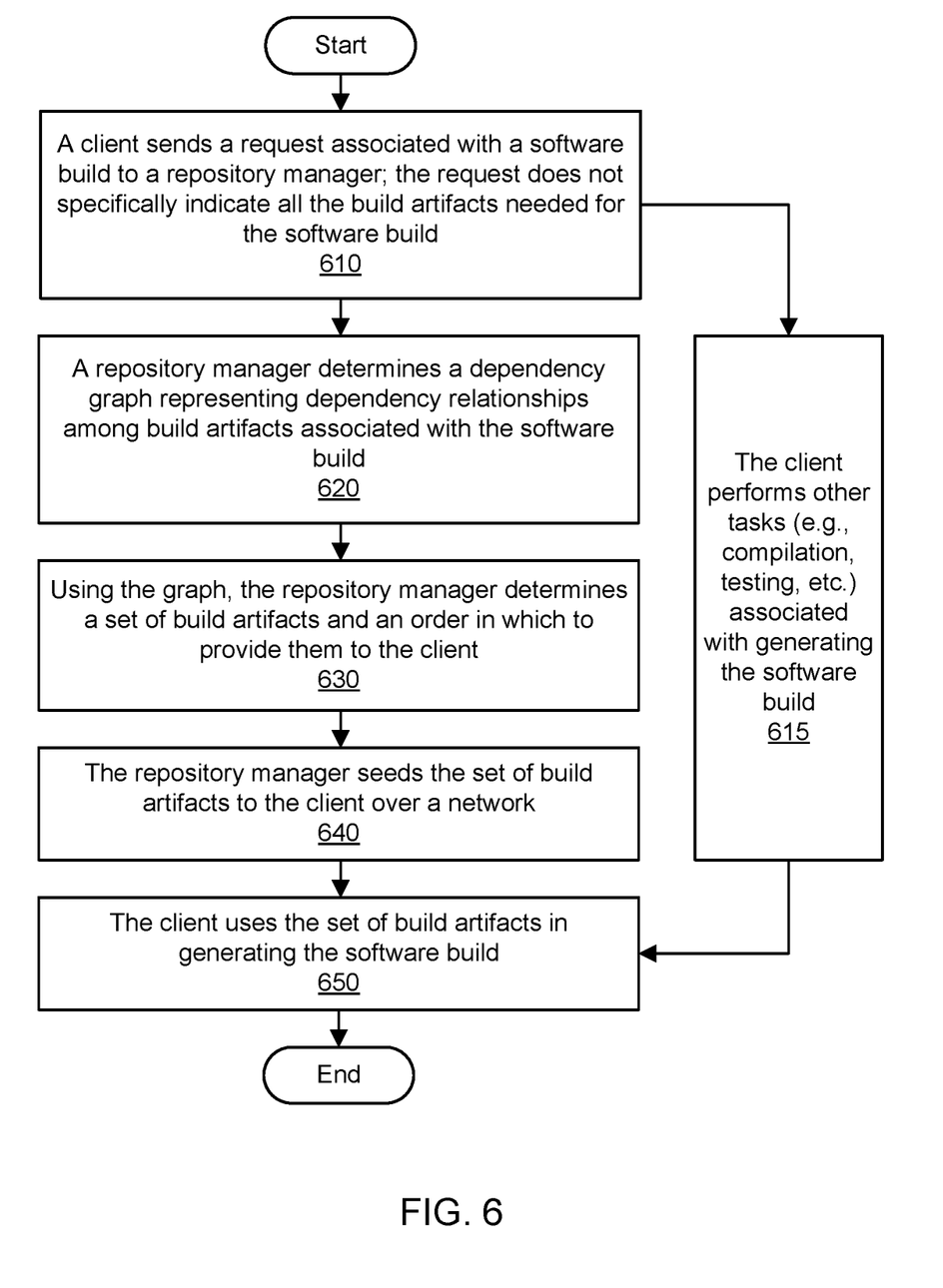
FIG. 6 is a flowchart illustrating a method for proactive seeding of build artifacts, according to some embodiments.

FIG. 6 is a flowchart illustrating a method for proactive seeding of build artifacts, according to some embodiments. As shown in 610, a client may send a request associated with a software build to a repository manager. The repository manager may provide access to build artifacts maintained by one or more repositories. The request may not specifically indicate all the build artifacts needed for the software build. In one embodiment, the request may not specifically identify any of the build artifacts. In one embodiment, the request may not specifically identify all of the build artifacts that are proactively seeded to the client; for example, the request may identify one build artifact such as a compiler plugin, and the repository manager may identify other build artifacts that have dependency relationships with the artifact identified in the request. In one embodiment, the request may include an indication of the particular software build that the client is seeking to generate. In one embodiment, the request may include a portion of the dependency graph for a particular software build, e.g., as determined by static analysis of the source code by a software build tool.

As shown in 620, the repository manager may determine a dependency graph that represents dependency relationships among build artifacts associated with the software build. The graph may represent a directed graph or tree. The graph may include nodes that represent build artifacts and edges that represent dependency relationships. The graph may be built using artifact metadata maintained by the repository. In one embodiment, the metadata may include formal dependency relationships between build artifacts, e.g., as determined using static analysis of the artifacts themselves. In one embodiment, the metadata may include informal dependency relationships between build artifacts, e.g., as determined using dynamic analysis of artifact execution by monitoring network use in the build environment. In one embodiment, at least some of the metadata may be determined based on prior interactions with this user or different users, e.g., for building prior versions of the current software build. In one embodiment, at least some of the metadata may be determined based on static analysis of the source code of a software build.

As shown in 630, using the graph, the repository manager may determine a set of build artifacts to be proactively seeded to the client. Using the graph, the repository manager may also determine an order in which to seed the build artifacts. For example, the repository manager may determine that a first set of one or more build artifacts should be sent at a first time, then another set of one or more build artifacts should be sent at a second time, and so on, until all the build artifacts of the graph have been provided to the client. The order may be based on a breadth-first traversal of the graph, a depth-first traversal of the graph, or a combination thereof. In determining the order in which to seed the build artifacts, the repository manager may seek to satisfy dependency relationships among artifacts and to reduce latency at the client.

As shown in 640, the repository manager may seed the set of build artifacts to the client over a network. For example, a compiler plugin may be needed early in the build process by a software build tool, potentially even before the source code of a project is retrieved. The repository manager may know (based on the metadata) that the standard version of the compiler plugin has a tree with twenty dependencies, and so the repository manager may seed those twenty build artifacts on which the compiler depends, either before seeding the compiler or in the same batch of artifacts. The build artifact seeder may use multiple network connections or one network connection to send multiple artifacts concurrently. In one embodiment, the repository manager may use an HTTP/2 server push to proactively seed build artifacts into a cache at the client. Using HTTP/2, the repository manager may have a view of the client-side cache. The software build tool at the client may issue requests for build artifacts using HTTP/2, and the requests may be directed to the cache instead of to the repository or repository manager. The cache may respond by providing the proactively seeded artifacts to the build tool. In one embodiment, seeding the artifacts may include the repository manager retrieving the set of build artifacts from one or more repositories and then sending the artifacts to the client. In one embodiment, seeding the artifacts may include the repository manager sending links or references to the set of build artifacts to the client and the client then pulling the artifacts from one or more repositories using the links or references. In one embodiment, the repository manager may seed the artifacts by physically sending a storage device from one physical location (e.g., a data center that hosts the repository manage) to another physical location (e.g., a data center that hosts the client).

As shown in 650, the client may use the set of build artifacts in generating the software build. Generating the software build may include operations such as source code generation, compilation, unit testing, packaging, and deployment to a production environment. The operations shown in 610 through 650 may be performed multiple times for a particular software build. For example, the repository manager may determine a dependency graph for one module and proactively seed artifacts based on that graph, then determine another dependency graph for another module and proactively seed artifacts based on that graph, and so on. As shown in 615, the client may perform other tasks associated with generating the software build while the proactively seeded artifacts are being determined, fetched, and seeded to the client. In this manner, the software build process may be expedited such that the build process need not have to wait while build artifacts needed at a current stage are being fetched.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or a variety of different computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a repository storing a plurality of build artifacts; and
one or more computing devices configured to implement a build artifact repository manager, wherein the build artifact repository manager is configured to:
determine a dependency graph representing dependency relationships among a plurality of build artifacts associated with a software build, wherein at least some of the build artifacts comprise program code;
determine, using the dependency graph, a first set of one or more build artifacts and an order in which to provide the first set to a client, wherein the first set is determined without the build artifact repository manager receiving a request from the client that identifies the one or more build artifacts in the first set;
retrieve the first set of one or more build artifacts from the repository; and
send, over a network to the client in a build environment, the first set of one or more build artifacts in the order, wherein the first set of one or more build artifacts are used in the build environment to generate the software build.

2. The system as recited in claim 1, wherein the build artifact repository manager is configured to:
determine, using the dependency graph, a second set of one or more build artifacts stored in the repository, wherein at least a portion of the second set are dependent on at least a portion of the first set; and
send, to the client over the network, the second set of one or more build artifacts, wherein the second set of one or more build artifacts are used in the build environment to generate the software build.

3. The system as recited in claim 1, wherein the dependency graph comprises one or more nodes representing one or more build artifacts determined using monitoring of one or more connections between the build environment and one or more external sources of build artifacts.

4. The system as recited in claim 1, wherein the first set of one or more build artifacts are sent to a cache memory of the client using an HTTP/2 server push.

5. A computer-implemented method, comprising:
   determining a dependency graph representing dependency relationships among a plurality of build artifacts;
   determining, by a repository manager using the dependency graph, a first set of one or more build artifacts stored in one or more repositories without having received an indication from a client that identifies each of the one or more build artifacts in the first set; and
   sending, to the client, the first set of one or more build artifacts, wherein the first set of one or more build artifacts are used by the client in generating a software build.

6. The method as recited in claim 5, wherein the first set comprises a plurality of build artifacts that are determined based at least in part on the repository manager receiving a request from the client that identifies at least one but not all of the build artifacts in the first set.

7. The method as recited in claim 5, wherein the first set of one or more build artifacts are sent from the repository manager to the client over a network.

8. The method as recited in claim 5, further comprising:
   determining, by the repository manager using the dependency graph, a second set of one or more build artifacts stored in the repository, wherein at least a portion of the second set are dependent on at least a portion of the first set; and
   sending, to the client, the second set of one or more build artifacts, wherein the second set of one or more build artifacts are used by the client in generating the software build.

9. The method as recited in claim 5, further comprising:
   determining, by the repository manager based at least in part on the dependency graph, an order in which to provide the first set of one or more build artifacts to the client, wherein the first set of one or more build artifacts are sent to the client according to the order.

10. The method as recited in claim 5, further comprising:
    monitoring one or more network connections associated with the client, wherein one or more additional build artifacts are obtained using the one or more network connections; and
    adding, to the dependency graph, one or more nodes representing the one or more additional build artifacts.

11. The method as recited in claim 5, wherein the first set of one or more build artifacts are sent from the repository manager to a cache memory of the client using an HTTP/2 server push.

12. The method as recited in claim 5, wherein the first set of one or more build artifacts are seeded to a proxy and sent from the proxy to the client.

13. The method as recited in claim 5, wherein the client is associated with a continuous integration environment, and wherein the software build is generated a plurality of times using the first set of one or more build artifacts.

14. A non-transitory computer-readable storage medium storing program instructions computer-executable to perform:
   determining a dependency graph representing dependency relationships among a plurality of build artifacts;
   determining, by a repository manager based at least in part on the dependency graph, a first set of one or more build artifacts stored in one or more repositories; and
   seeding, from the repository manager to a client over a network, the first set of one or more build artifacts, wherein the first set of one or more build artifacts are determined without the repository manager receiving a request from the client that identifies the one or more build artifacts in the first set, and wherein the first set of one or more build artifacts are used by the client in generating a software build.

15. The non-transitory computer-readable storage medium as recited in claim 14, wherein the program instructions are further computer-executable to perform:
    determining, by the repository manager using the dependency graph, a second set of one or more build artifacts stored in the repository, wherein at least a portion of the second set are dependent on at least a portion of the first set; and
    sending, from the repository manager to the client over the network, the second set of one or more build artifacts, wherein the second set of one or more build artifacts are used by the client in generating the software build.

16. The non-transitory computer-readable storage medium as recited in claim 14, wherein the program instructions are further computer-executable to perform:
    determining, by the repository manager based at least in part on the dependency graph, an order in which to provide the first set of one or more build artifacts to the client, wherein the first set of one or more build artifacts are sent to the client according to the order.

17. The non-transitory computer-readable storage medium as recited in claim 14, wherein the program instructions are further computer-executable to perform:
    monitoring one or more network connections associated with the client, wherein one or more additional build artifacts are obtained using the one or more network connections; and
    adding, to the dependency graph, one or more nodes representing the one or more additional build artifacts.

18. The non-transitory computer-readable storage medium as recited in claim 14, wherein the first set of one or more build artifacts are sent from the repository manager to a cache memory of the client using an HTTP/2 server push.

19. The non-transitory computer-readable storage medium as recited in claim 14, wherein the first set of one or more build artifacts are stored in a cache memory external to the client and external to the repository manager and retrieved by the client from the cache memory in generating the software build.

20. The non-transitory computer-readable storage medium as recited in claim 14, wherein the client is associated with a continuous integration environment, and wherein the software build is generated a plurality of times using the first set of one or more build artifacts.

* * * * *